(12) United States Patent
Iwaki et al.

(10) Patent No.: US 7,379,240 B2
(45) Date of Patent: May 27, 2008

(54) REAR PROJECTION-TYPE SCREEN AND REAR PROJECTION-TYPE IMAGE DISPLAY DEVICE

(75) Inventors: Takaaki Iwaki, Tokyo (JP); Kyoichi Murakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 10/521,610

(22) PCT Filed: Jul. 15, 2003

(86) PCT No.: PCT/JP03/08983

§ 371 (c)(1),
(2), (4) Date: Aug. 15, 2005

(87) PCT Pub. No.: WO2004/008243

PCT Pub. Date: Jan. 22, 2004

(65) Prior Publication Data

US 2006/0126172 A1    Jun. 15, 2006

(30) Foreign Application Priority Data

Jul. 16, 2002    (JP) .............................. 2002-206810

(51) Int. Cl.
  *G03B 21/60*    (2006.01)
  *G03B 21/56*    (2006.01)
(52) U.S. Cl. ........................ 359/457; 359/456; 359/460
(58) Field of Classification Search ................ 359/443, 359/454–457, 460
See application file for complete search history.

(56) References Cited

U.S. PATENT DOCUMENTS

| 5,513,036 | A | 4/1996 | Watanabe et al. |
| 6,348,993 | B1 * | 2/2002 | Hori ........................... 359/443 |
| 6,618,196 | B2 * | 9/2003 | Ikari et al. .................. 359/457 |
| 2003/0030903 | A1 * | 2/2003 | Honda et al. ............... 359/457 |

FOREIGN PATENT DOCUMENTS

| JP | 2001-324766 |   | 11/2001 |
| JP | 2001324766 A | * | 11/2001 |
| JP | 2002-107829 |   | 4/2002 |
| JP | 2002107829 A | * | 4/2002 |

* cited by examiner

Primary Examiner—Diane I. Lee
Assistant Examiner—Magda Cruz
(74) Attorney, Agent, or Firm—Frommer Lawrence & Haug LLP; William S. Frommer

(57) ABSTRACT

A rear projection-type screen includes two sheet-like members having lenses prevented from being deformed and scratched. In the rear projection-type screen (5) for passing and focusing image light L emitted from an image light source (3), two sheet-like members (a lenticular lens sheet 7 and a Fresnel lens sheet 8) each made of a transparent material and having minute lenses (9) and (11) formed on at least one surface thereof are disposed such that their surfaces (7b) and (8a) with the lenses formed thereon confront each other, and a plurality of spacers (14), (14), . . . are disposed at appropriate spaced intervals between the confronting lenses of the two sheet-like members within an effective screen area (5a) for passing and focusing the image light thereon.

12 Claims, 14 Drawing Sheets

REAR PROJECTION-TYPE SCREEN AND REAR PROJECTION-TYPE IMAGE DISPLAY DEVICE

TECHNICAL FIELD

The present invention relates to a rear projection-type screen and a rear projection-type image display device, and more particularly to a technique for increasing the quality of an image displayed by a rear projection-type image display device having a rear projection-type screen for displaying an image by passing image light emitted from an image light source to a front surface of the screen.

BACKGROUND ART

In recent years, there has widely been used a rear projection-type image display device (hereinafter simply referred to as "image display device") for projecting image light, onto a rear projection-type screen (hereinafter simply referred to as "projection screen") at an enlarged scale achieved by projection means such as a projection lens or the like. The image light is modulated by an image signal emitted from a relatively small image light source such as a cathode-ray tube (CRT) display unit, a liquid-crystal display (LCD) unit, a digital mirror device (DMD), or the like.

In the above image display device, generally, the image light projected onto the rear surface of the projection screen passes through the projection screen and is focused in the vicinity of the front surface thereof, and the focused image light is recognized by the observer in the front direction of the image display device.

FIG. 13 shows an example "a" of the projection screen of a conventional rear projection-type image display device. The projection screen "a" has two sheet-like members closely spaced from each other by a suitable distance.

When the observer views the image display device, an angular distribution of horizontal viewing positions of the observer is greater than an angular distribution of vertical viewing positions of the observer. Therefore, the rear projection-type image display device is required to obtain emitted light in a wider angle in the horizontal direction than in the vertical direction.

The two sheet-like members of the projection screen "a" include, respectively, a lenticular lens sheet "c" having a lenticular lens "b" including a number of cylindrical lenses b1, b1, . . . extending vertically on its rear surface, and a Fresnel lens sheet "e" closely spaced a suitable distance from the lenticular lens sheet "c" and having a Fresnel lens "d" on its surface (front surface) facing the lenticular lens sheet "c".

Image light is emitted from an image light source (not shown) and projected at an enlarged scale by projection means onto the rear surface of the projection screen "a". The image light is converted into parallel rays of light by the Fresnel lens "d" of the Fresnel lens sheet "e", and then the parallel rays of light are focused by the lenticular lens "b" of the lenticular lens sheet "c" onto a number of linear focused points f, f, . . . extending vertically at positions near the front surface of the lenticular lens sheet "c" (see FIG. 13). The image light focused onto the focused points f, f, . . . is spread in the horizontal direction wherein the distribution of viewing positions of the observer is greater. The Fresnel lens "d" of the Fresnel lens sheet "e" is also effective to improve a reduction in luminance at the four corners of the projection screen "a".

The lenticular lens sheet "c" and the Fresnel lens sheet "e" are of a structure in which the lenticular lens "b" or the Fresnel lens "d" formed of ultraviolet (UV)-curable resin is laminated on a base of acrylic resin, or a structure in which the lenticular lens "b" or the Fresnel lens "d" and the base are integrally formed of acrylic resin.

With the conventional rear projection-type screen such as the projection screen "a" described above, it is ideal that the sheet-like lenses be held in contact with each in the central region thereof.

Generally, however, the sheet-like members such as the lenticular lens sheet and the Fresnel lens sheet are coupled integrally together by tapes applied to peripheral edges thereof. Consequently, the sheet-like members tend to be spaced from each other in the central region that is farthest from the peripheral edges. If the sheet-like members of the rear projection-type screen are too spaced from each other, then the image light may be focused into double images, which make the image blur.

With the conventional rear projection-type screen such as the projection screen "a" described above, as shown in FIGS. 14 and 15, it is customary to form one of the sheet-like members, e.g., the lenticular lens sheet "c", as a warped sheet-like member, place the warped lenticular lens sheet "c" over the other sheet-like member, i.e., the Fresnel lens sheet "e", apply a pressure to superpose the peripheral edge of the lenticular lens sheet "c" on the peripheral edge of the Fresnel lens sheet "e", and apply tapes "g" or the like to their peripheral edges to secure the lenticular lens sheet "c" and the Fresnel lens sheet "e" integrally to each other (see FIG. 15).

In the projection screen "a" shown in FIG. 15, since the lenticular lens sheet "c" is originally of the warped shape, after the lenticular lens sheet "c" and the Fresnel lens sheet "e" are integrally combined with each other, the lenticular lens "b" and the Fresnel lens "d" remain in contact with each other in the central region that is remotest from the secured peripheral edges thereof. Therefore, the lenticular lens sheet "c" and the Fresnel lens sheet "e" are prevented from being too spaced from each other.

With the sheet-like member such as the lenticular sheet lens c being warped beforehand, however, the lenticular lens sheet "c" and the Fresnel lens sheet "e" are possibly pressed against each other under strong forces in the central region. When the lenticular lens sheet "c" and the Fresnel lens sheet "e" are pressed against each other under strong forces, the lens elements of the lenticular lens "b" and the Fresnel lens "d" are strongly pressed against each other, tend to be deformed in shape, and changed in optical characteristics. As a result, the path of the emitted light may be changed to focus the light into a blurred image. In particular, Fresnel lenses are easily deformable when pressed because they are often made of a relatively soft UV-curable resin laminated on a base of acrylic resin.

Even if the lens elements of the lenticular lens "b" and the Fresnel lens "d" are not held in contact with each other under forces strong enough to deform them, when they are continuously vibrated as during shipment, the lens surfaces may be rubbed and scratched due to the contact between the lenses. The scratch may be liable to cause the projection screen "a" to display double or triple images thereon.

According to one solution, as shown in FIG. 15, the conventional rear projection-type screen such as the projection screen "a" has spacers h, h, . . . . The spacers h, h, . . . are suitable shape and size sandwiched between the lenticular lens sheet "c" and the Fresnel lens sheet "e" along the peripheral edge of the projection screen "a" through which the image light does not pass, i.e., which is outside of the effective screen area. The spacers h, h, . . . keep the lenticular lens sheet "c" and the Fresnel lens sheet "e" spaced from each other over their entire area, thereby keeping the lenticular lens "b" and the Fresnel lens "d" out of contact with each other in the central region.

However, since the spacers h, h, . . . are positioned in the peripheral edge that is located outside of the effective screen area mostly remotely from the central area of the projection screen "a", the method using spacers h, h, . . . poses a limitation on the ability to keep the lenticular lens "b" and the Fresnel lens "d" from contacting each other.

In view of the above problems, it is an object of the present invention to provide a rear projection-type screen including two sheet-like members for use in a rear projection-type image display device. The two sheet-like members are spaced an optimum distance from each other within an effective screen area to prevent lenses of the two sheet-like members from being deformed and scratched for increasing the quality of images displayed thereby.

DISCLOSURE OF THE INVENTION

To achieve the above object, a rear projection-type screen according to the present invention resides in that two sheet-like members each made of a transparent material and having minute lenses formed on at least one surface thereof are disposed such that their surfaces with the lenses formed thereon confront each other, and a plurality of spacers are disposed at appropriate spaced intervals between the confronting lenses of the two sheet-like members within an effective screen area and in a peripheral region of the effective screen area for passing and focusing the image light thereon.

A rear projection-type image display device according to the present invention has a rear projection-type screen for passing and focusing the image light projected by an image light source. The rear projection-type screen includes two sheet-like members each made of a transparent material and having minute lenses formed on at least one surface thereof. The two sheet-like members are disposed such that their surfaces with the lenses formed thereon confront each other, and a plurality of spacers are disposed at appropriate spaced intervals between the confronting lenses of the two sheet-like members within an effective screen area for passing and focusing the image light thereon.

With the rear projection-type screen and the rear projection-type image display device according to the present invention, the spacers disposed between the confronting lenses of the sheet-like members keep the lenses spaced from each other in the effective screen area.

BEST MODE FOR CARRYING OUT THE INVENTION

An embodiment of a rear projection-type screen and a rear projection-type image display device according to the present invention will be described below with reference to the accompanying drawings.

First, an arrangement of a rear projection-type image display device 1 will briefly be described below.

Figure 1:
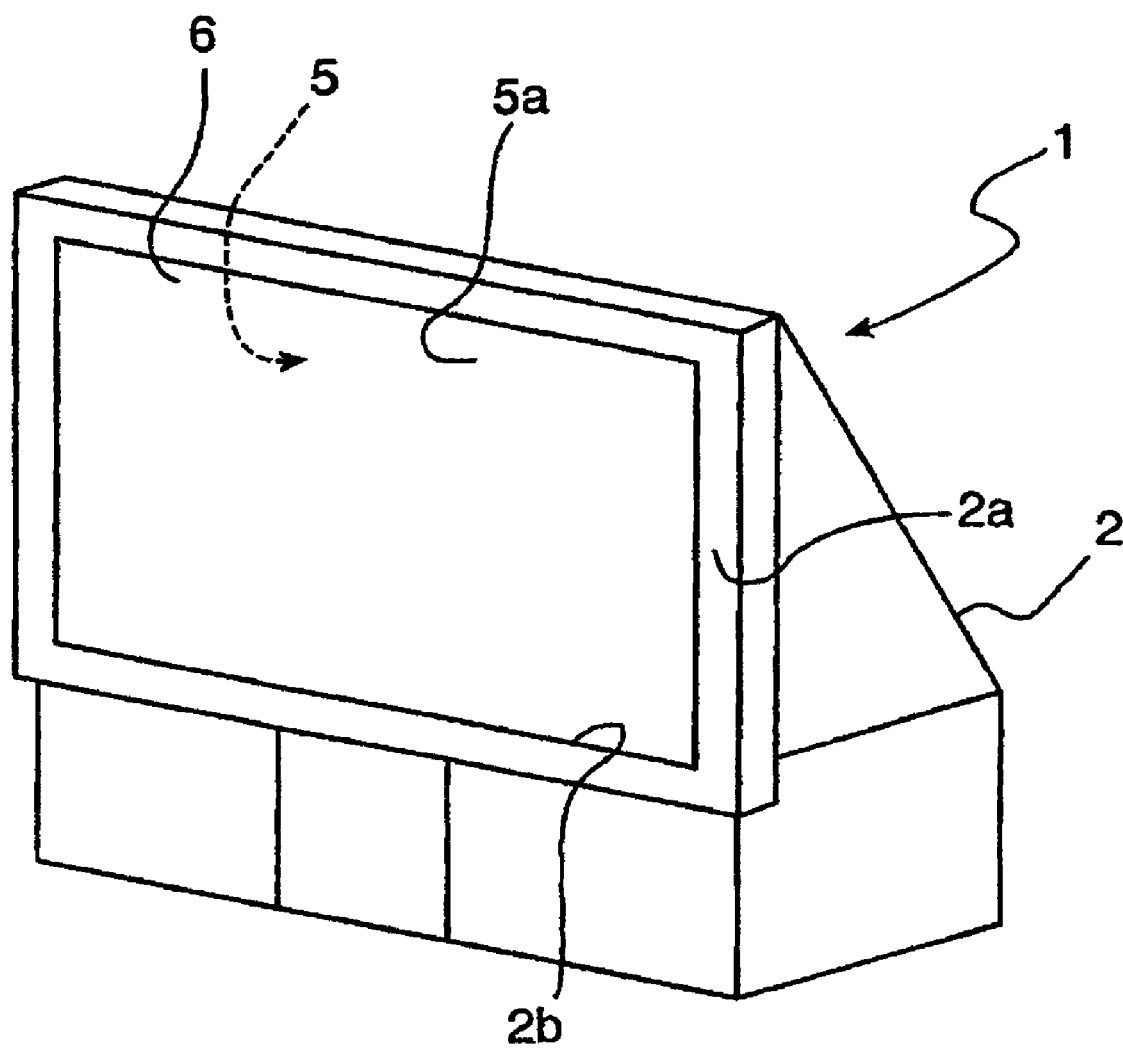
FIG. 1 shows, together with FIGS. 2 through 12, an embodiment of the present invention, and is a perspective view of a rear projection-type image display device.
Figure 2:
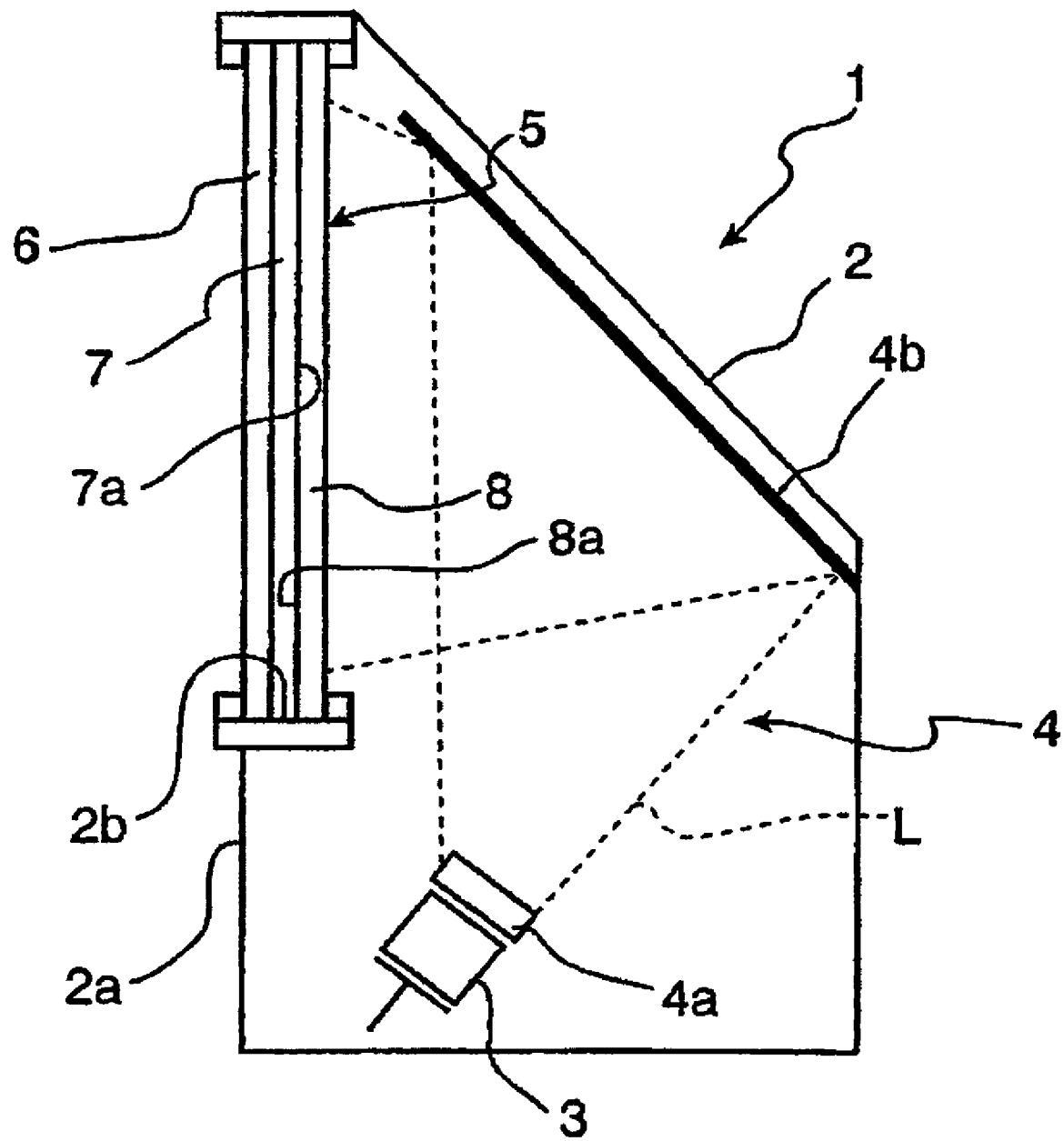
FIG. 2 is a vertical cross-sectional view schematically showing an internal structure of the rear projection-type image display device.

As shown in FIGS. 1 and 2, the rear projection-type image display device (hereinafter simply referred to as "image display device") 1 has an image light source 3, projection means 4, a rear projection-type screen ((hereinafter simply referred to as "projection screen") 5, etc. disposed in a box-like cabinet 2.

The image light source 3 may include a cathode-ray tube (CRT) display unit, a liquid-crystal display (LCD) unit, a digital mirror device (DMD), or the like.

Image light L modulated by an image signal and emitted from the image light source 3 is enlarged and applied to the rear surface of the projection screen 5 by the projection means 4. The projection means 4 includes a projection unit 4a having a projection lens, etc. and a reflecting mirror 4b, as indicated by the broken lines in FIG. 2.

As shown in FIGS. 1 and 2, the projection screen 5 is disposed so as to close an opening 2b defined in a front panel 2a of a cabinet 2. The projection screen 5 includes a combination of two sheet-like members having different optical characteristics for providing an appropriate viewing angle (a range in which an image displayed on the screen can properly be recognized) and reducing the effect of external light. The projection screen 5 is not limited to any particular size. However, the projection screen 5 for use in the image display device 1 according to the present embodiment is assumed to have an effective screen area 5a having a diagonal dimension of 40 inches or more which serves as an area where the image light emitted from the image light source 3 passes.

As shown in FIG. 2, a protective cover 6 made of a hard material for covering and protecting the front surface of the projection screen 5 is disposed over the front surface of the projection screen 5.

The projection screen 5 includes two sheet-like members (a lenticular lens sheet 7 and a Fresnel lens sheet 8) arranged successively from the front panel 2a of the cabinet 2 and each made of a transparent material.

As shown in FIG. 2, the lenticular lens sheet 7 is positioned between the projective cover 6 and the Fresnel lens sheet 8 to be described later. As shown in FIGS. 3 through 6, the lenticular lens sheet 7 has a lenticular lens 9 including a number of cylindrical lenses (lens elements) 9a, 9a, . . . extending vertically on a rear surface 7a thereof.

The lenticular lens sheet 7 also has on its front surface 7b a number of minute ridges 10, 10, . . . extending vertically parallel to each other. Black external light absorbing layers (so-called black stripes) 10a, 10a, . . . are laminated on the front end faces of the ridges 10, 10, . . . (see FIGS. 4 and 5).

As shown in FIGS. 3 through 6, the lenticular lens sheet 7 has valleys 9b, 9b, . . . defined in the boundaries between adjacent ones of the cylindrical lenses 9a, 9a, . . . of the lenticular lens 9 and positioned in confronting relation to the ridges 10, 10, . . . in the fore-and-aft direction.

The cylindrical lenses 9a, 9a, . . . of the lenticular lens 9 are formed at a pitch ranging from about 0.5 to 0.7 mm if the image light source 3 is a CRT and ranging from about 0.05 to 0.2 mm if the image light source 3 is an LCD. Since the cylindrical lenses 9a, 9a, . . . thus formed at such a very small pitch cannot be shown, they are illustrated as being exaggerated (and so is the Fresnel lens 11).

As shown in FIGS. 3 through 5 and 7, the Fresnel lens sheet 8 has a Fresnel lens 11 including concentric ring strips (lens elements) 11a, 11a, . . . on a front surface 8a. A rear surface 8b is a flat surface free of lenses. The Fresnel lens 11 of the Fresnel lens sheet 8 is also effective to improve a reduction in luminance at the four corners of the projection screen 5.

The lenticular lens sheet 7 and the Fresnel lens sheet 8 have a lens shape produced by applying UV (ultraviolet)-curable resin to a base of acrylic resin, or a lens shape produced by forming the base integrally with acrylic resin. In particular, the Fresnel lens 11 of the Fresnel lens sheet 8 is frequently formed of UV-curable resin. The pitch of the ring strips 11a, 11a, . . . of the Fresnel lens 11 and the height thereof from the front surface 8a are 0.1 mm at maximum.

Figure 3:
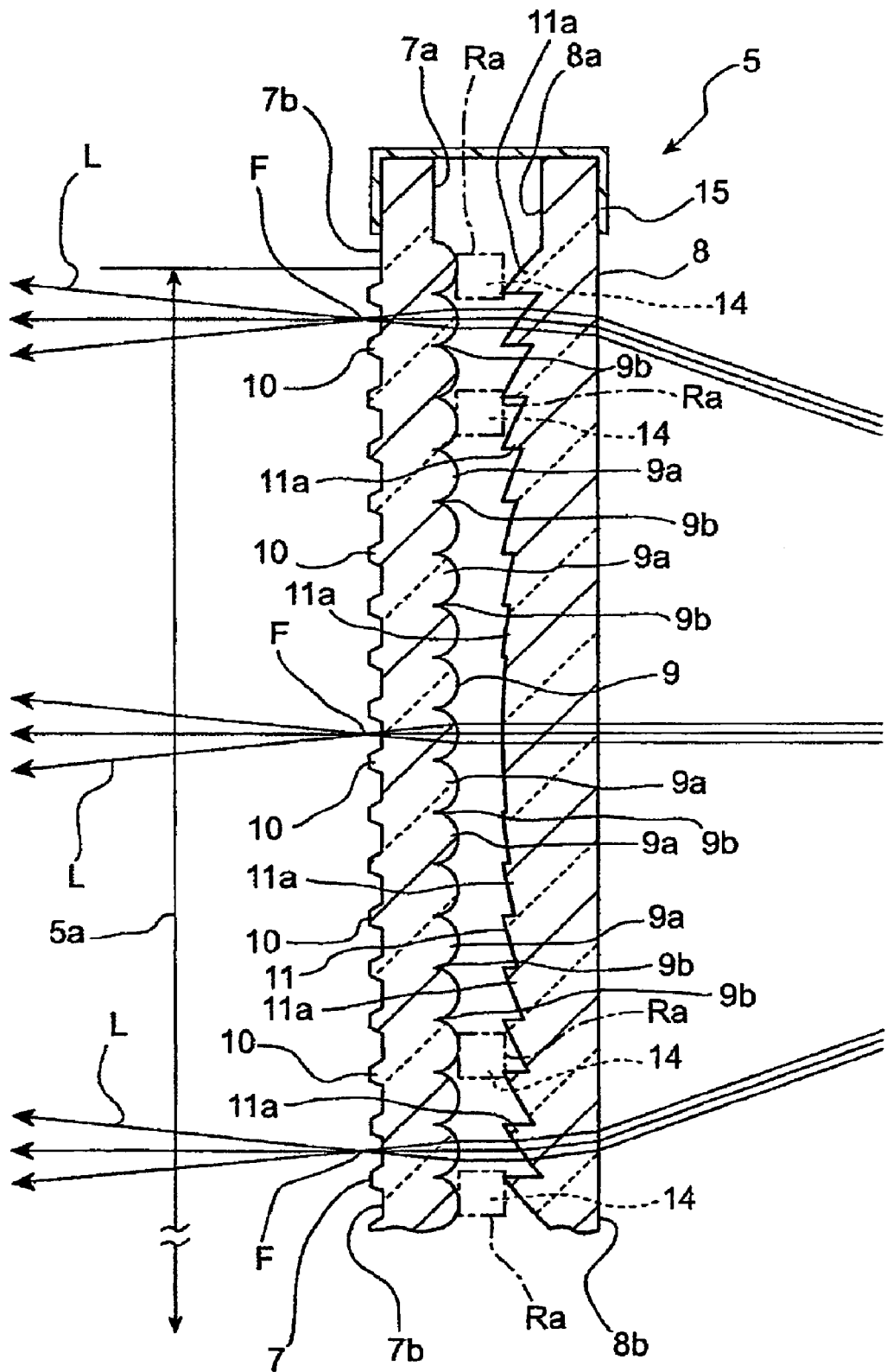
FIG. 3 is a horizontal cross-sectional view schematically showing the arrangement and function of a rear projection-type screen.

As shown in FIG. 3, the lenticular lens sheet 7 and the Fresnel lens sheet 8 are arranged such that the lenticular lens 9 and the Fresnel lens 11 confront each other.

As shown in FIG. 3, the image light L is emitted from the image light source 3 and projected onto the rear surface of the projection screen 5. The image light L is converted into parallel rays of light by the Fresnel lens 11 of the Fresnel lens sheet 8, and then the parallel rays of light are focused by the lenticular lens 9 of the lenticular lens sheet 7 onto a number of linear focused points F, F, . . . extending vertically at positions near the front surface 7b of the lenticular lens sheet 7. The image light focused onto the focused points F, F, . . . is spread in the horizontal direction wherein the distribution of viewing positions of the observer is greater.

Figure 8:
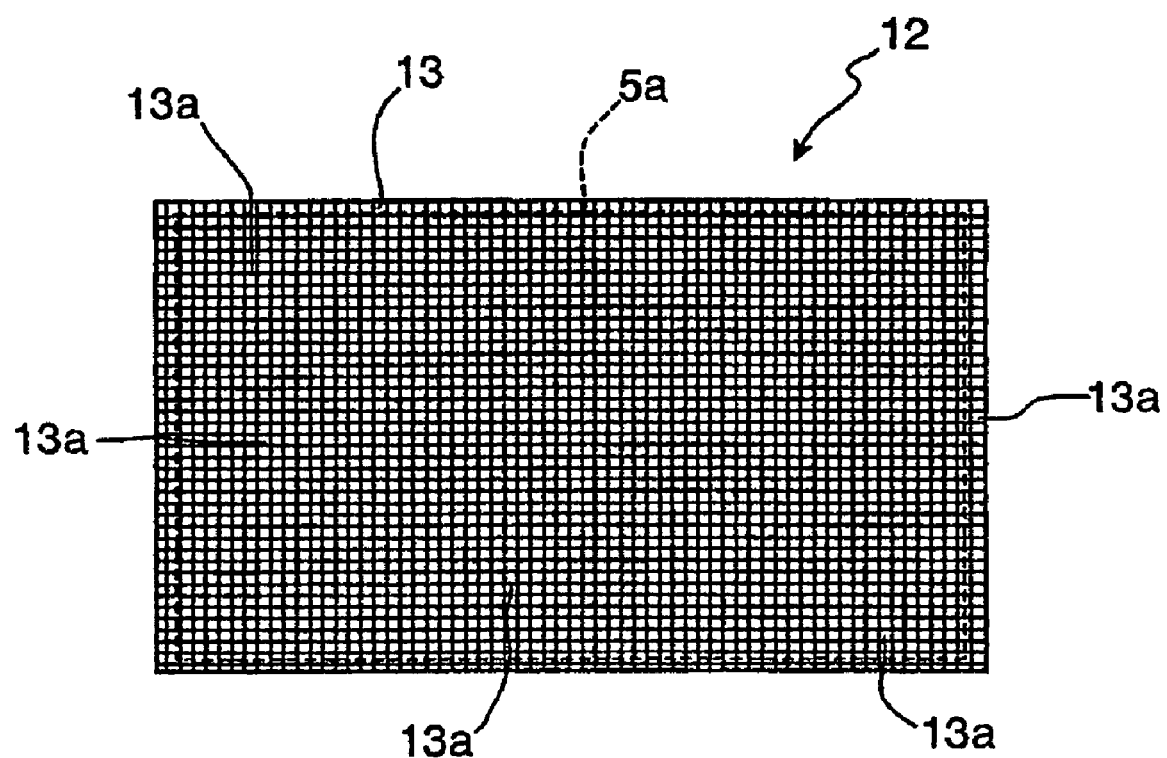
FIG. 8 is a rear elevational view of a compound-eye lens sheet.

The projection screen 5 may employ a compound-eye lens sheet 12 instead of the lenticular lens sheet 7. As shown in FIG. 8, the compound-eye lens sheet 12 may have a compound-eye lens 13 also referred to as a fly-eye lens including a number of rectangular convex lenses (lens elements) 13a, 13a, . . . , for example.

Figure 4:
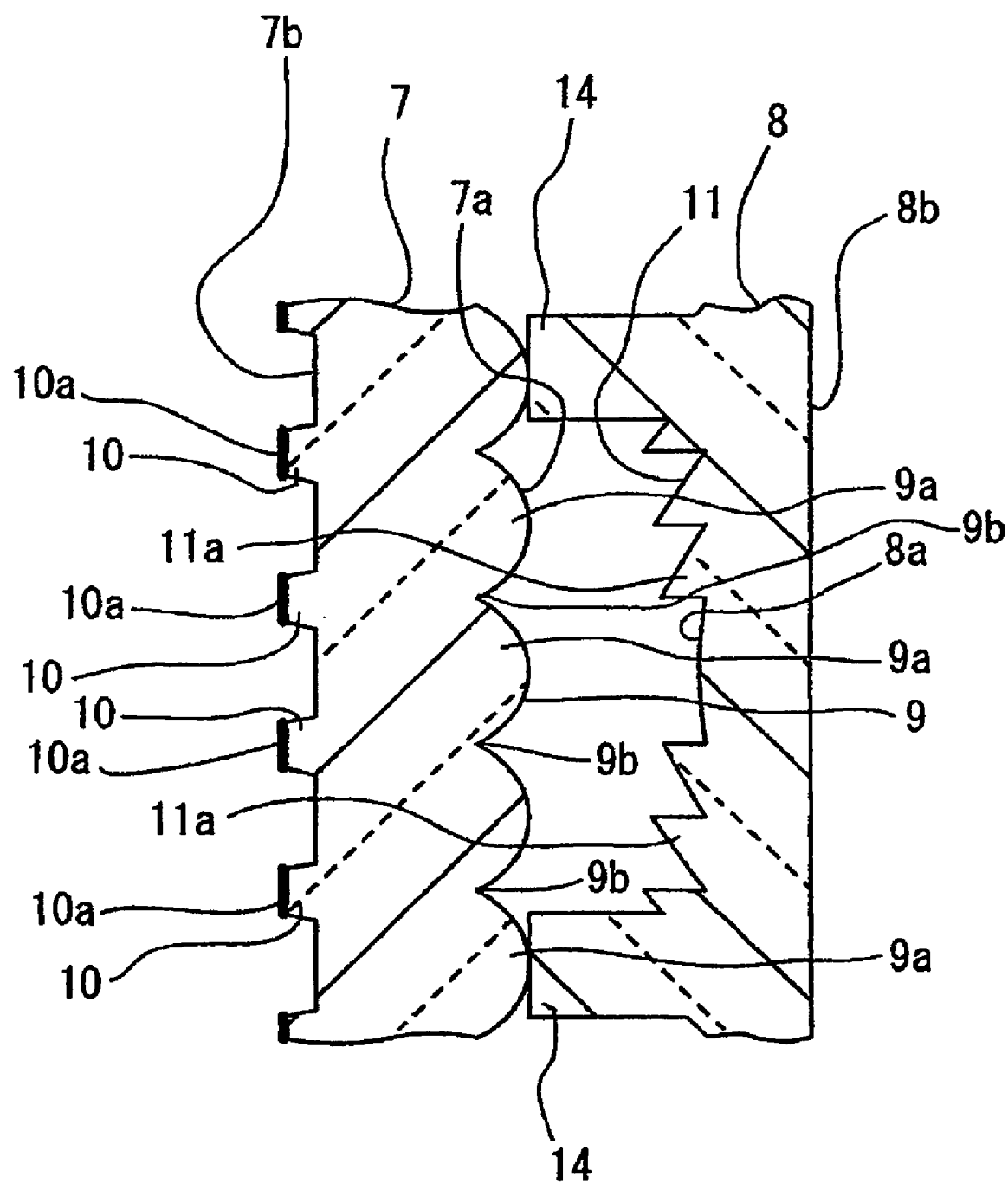
FIG. 4 is an enlarged fragmentary horizontal cross-sectional view showing spacers formed integrally with a lens.
Figure 5:
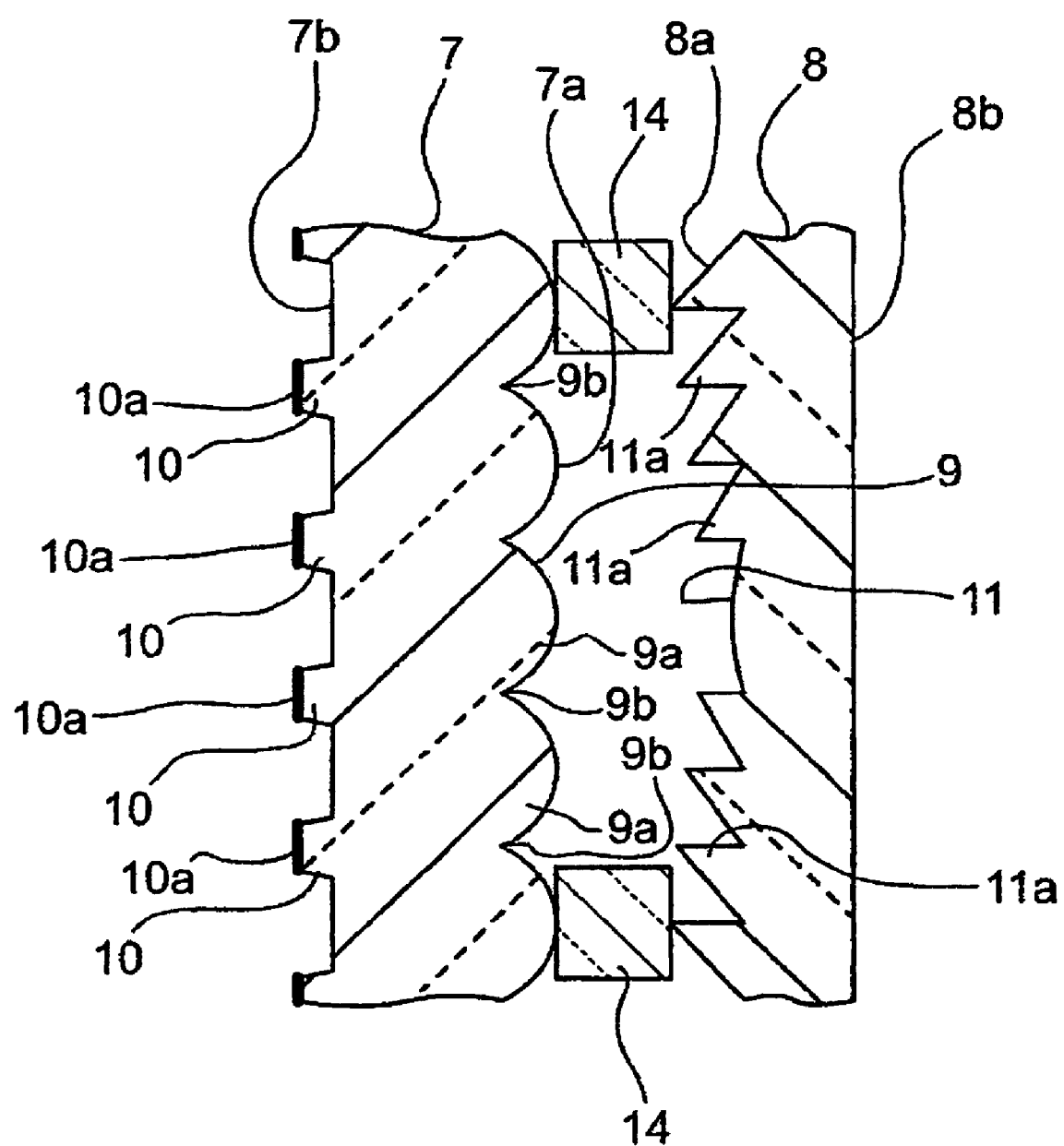
FIG. 5 is an enlarged fragmentary horizontal cross-sectional view showing spacers formed separately from a lens.
Figure 6:
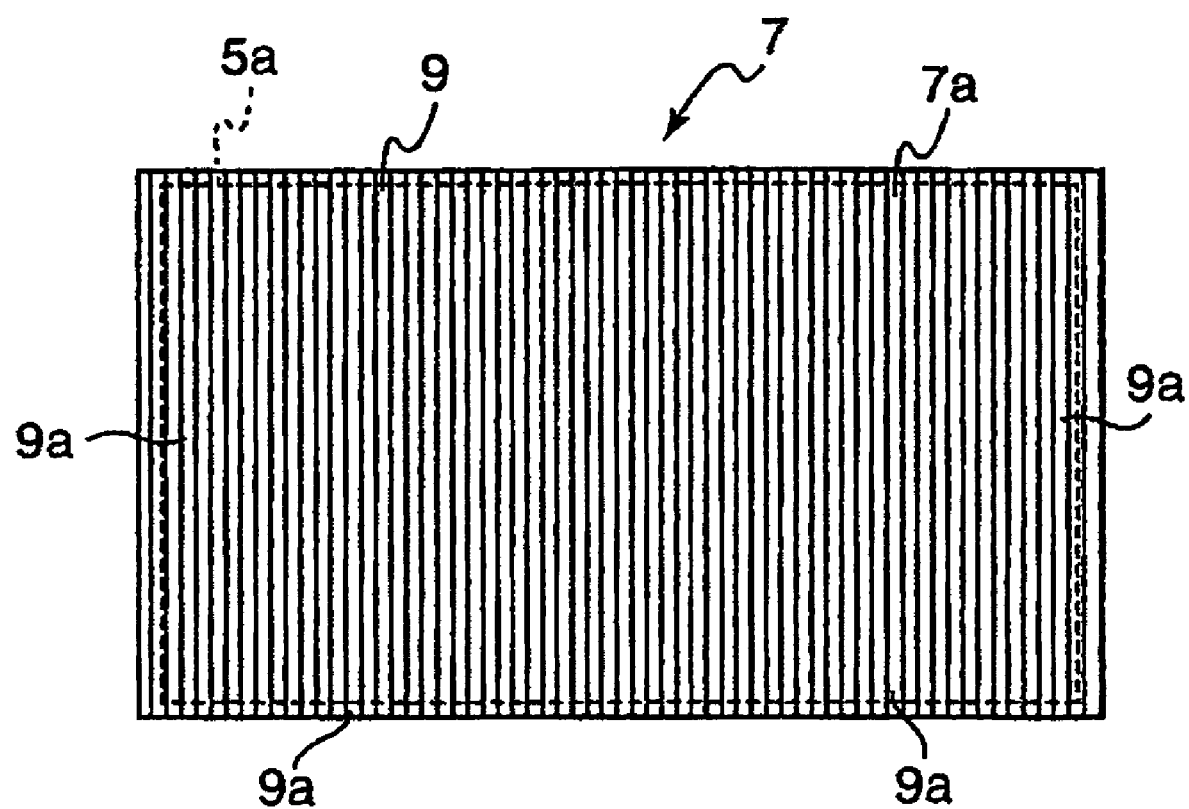
FIG. 6 is a rear elevational view of a lenticular lens sheet.
Figure 7:
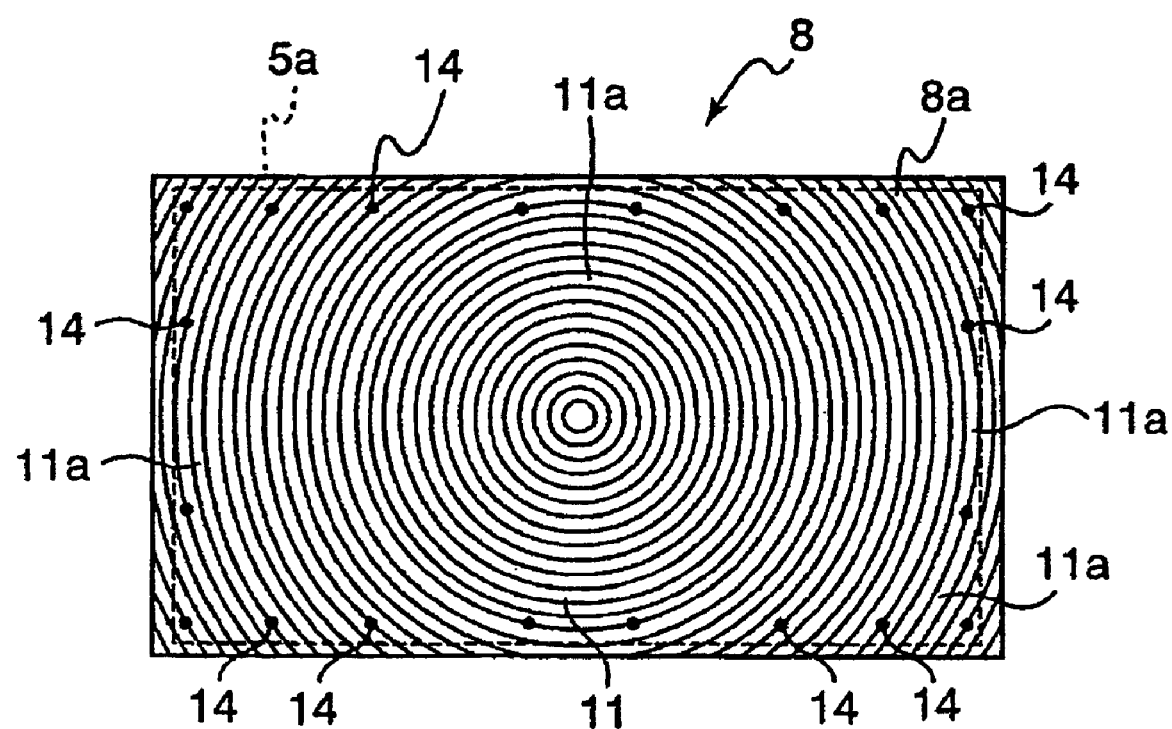
FIG. 7 is a front elevational view of a Fresnel lens sheet.

As shown in FIGS. 3 through 5, the projection screen 5 has, in its effective screen area 5a, a plurality of spacers 14, 14, . . . disposed between the lenticular lens sheet 7 (or the compound-eye lens sheet 12) and the Fresnel lens sheet 8. The spacers 14, 14, . . . are formed integrally with the lenticular lens sheet 7 or the Fresnel lens sheet 8 (see FIG. 4) or formed separately from the sheet-like member (see FIG. 5). As shown in FIG. 4, the spacers 14, 14, . . . are usually formed integrally with the Fresnel lens 11, and are disposed in a peripheral region of an area (an area indicated by the broken line in FIG. 7) corresponding to the effective screen area 5a of the projection screen 5.

The spacers 14, 14, . . . shown in FIG. 4 are formed integrally with the Fresnel lens 11. of the Fresnel lens sheet 8. The spacers 14, 14, . . . shown in FIG. 5 are formed separately from the lenticular lens sheet 7 and the Fresnel lens sheet 8.

Figure 9:
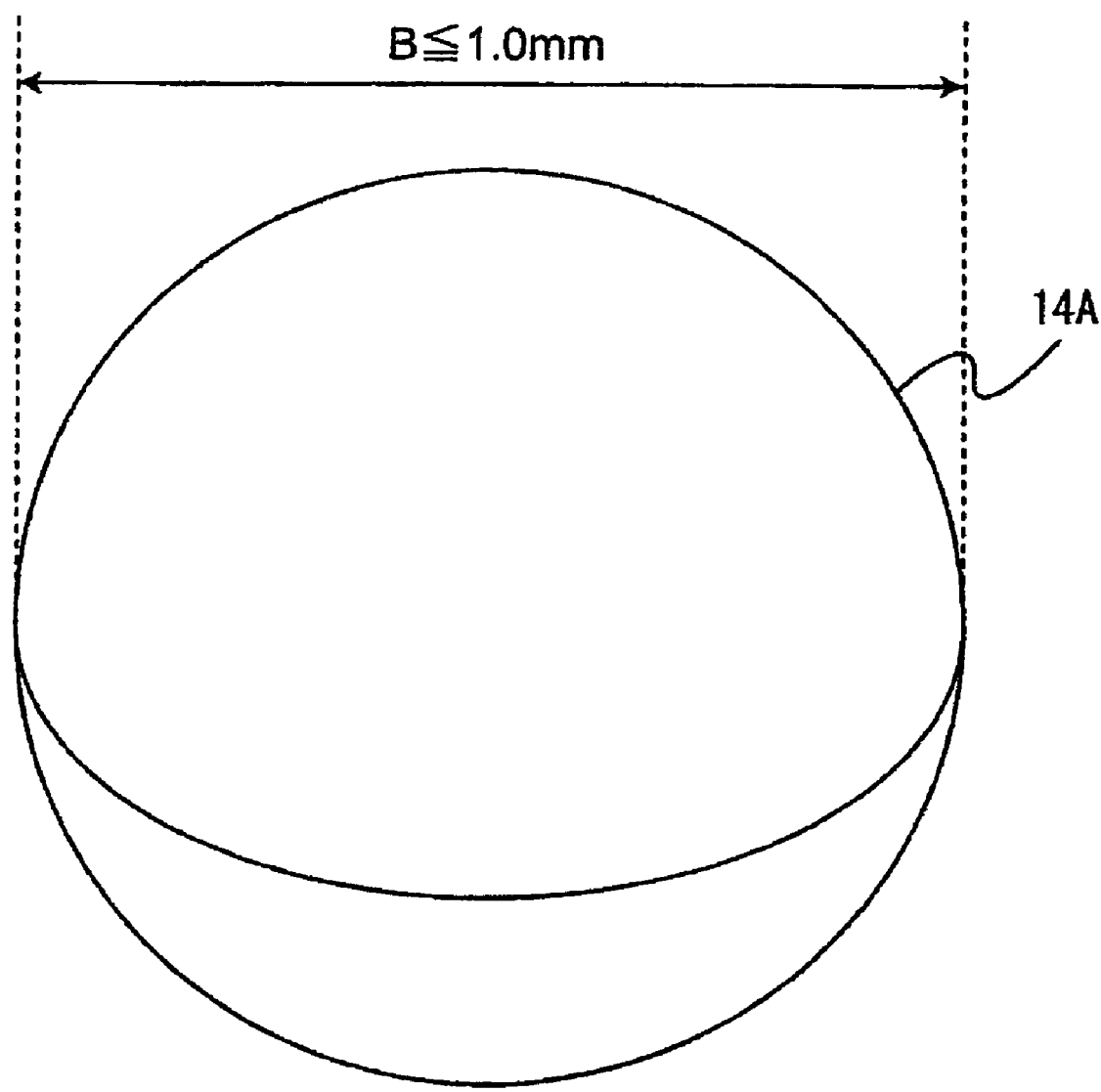
FIG. 9 is an enlarged perspective view showing an example of the shape of a spacer.
Figure 10:
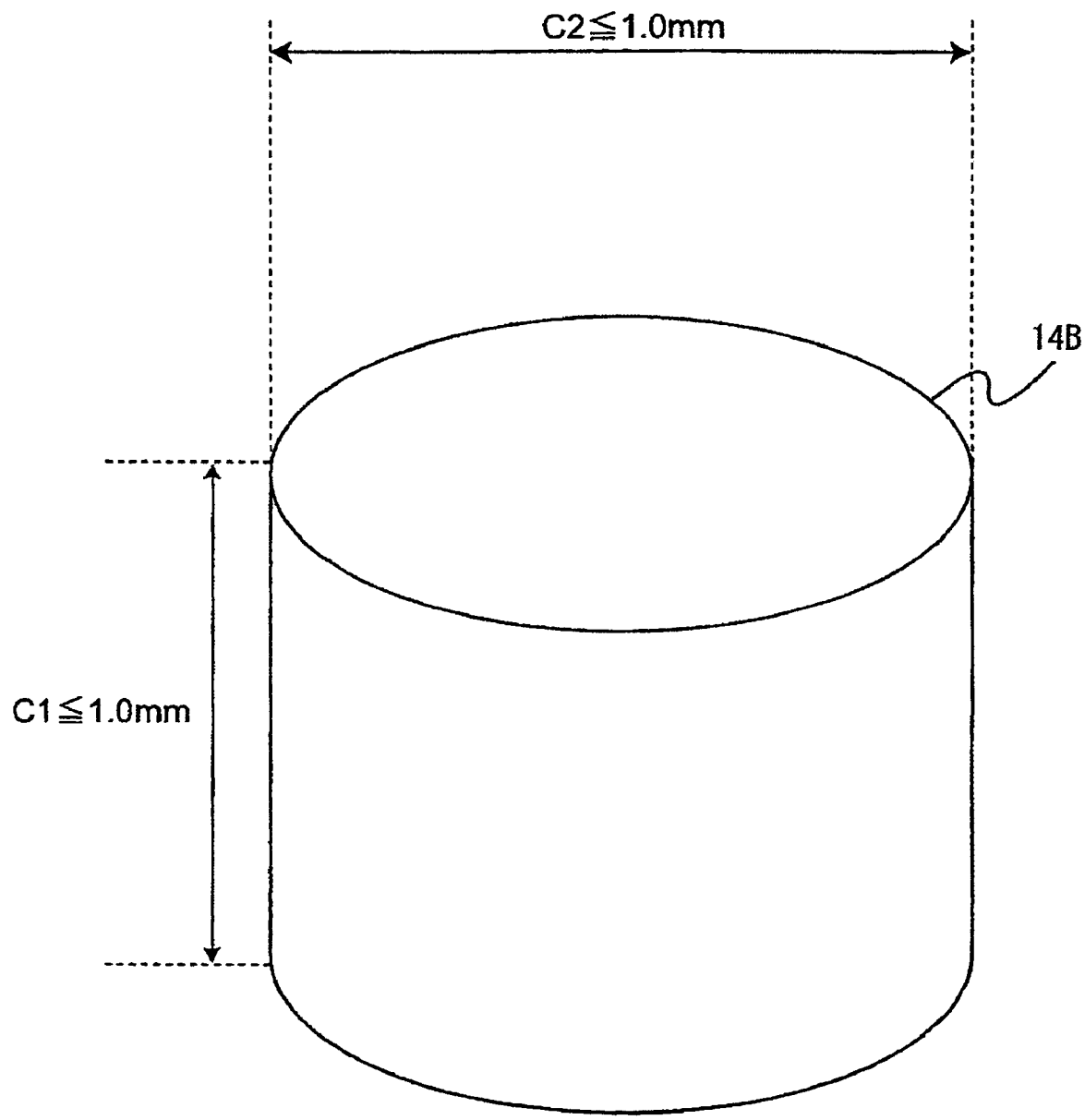
FIG. 10 is an enlarged perspective view showing another example of the shape of a spacer.
Figure 11:
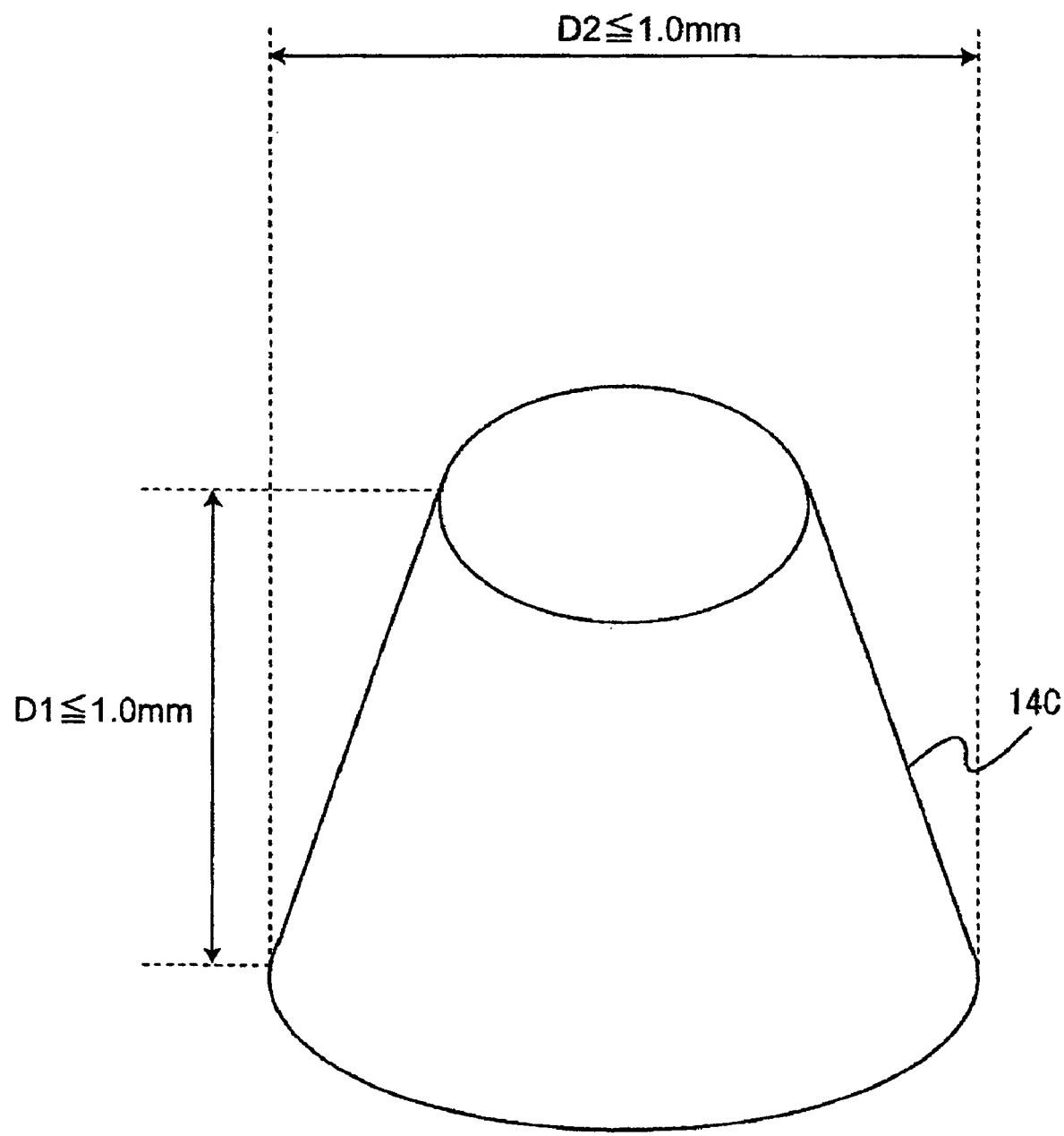
FIG. 11 is an enlarged perspective view showing still another example of the shape of a spacer.

The spacers 14, 14, . . . are not limited to any particular shapes. As shown in FIGS. 9 through 11, each of the spacers 14, 14, . . . may be of any of various shapes including a spherical spacer 14A, a cylindrical spacer 14B, and a frustoconical spacer 14C.

As shown in FIG. 3, the spacers 14, 14, . . . should preferably be formed to a size kept within a rectangular parallelepiped region Ra having a depth, a width, and a height each of 1 mm or less, regardless of the shape of the spacers 14, 14, . . . . Specifically, as shown in FIGS. 4 and 5, the spacers 14, 14, . . . formed integrally with or separately from the Fresnel lens 8 or the like have a size kept within a rectangular parallelepiped region Ra having a depth, a width, and a height each of 1 mm or less. If the spacers 14, 14, . . . are of a spherical, cylindrical, or frustoconical shape, then, as shown in FIGS. 9 through 11, the diameter B of the spherical spacer 14A, the height C1 and the end face diameter C2 of the cylindrical spacer 14B, and the height D1 and the end face diameter D2 of the frustoconical spacer 14C are of 1 mm or less.

Actually, the spacers 14, 14, . . . should ideally be of a size kept within a rectangular parallelepiped region having a depth, a width, and a height each of 0.3 mm or less so that their presence is essentially unrecognizable when the projection screen 5 is viewed from outside and they are not optically adversely influential. The size of the spacers 14, 14, . . . is determined to keep the lenticular lens 7 and the Fresnel lens 8 spaced from each other by a minimum distance large enough to prevent the reflected light from the sheets from being focused into double images.

Figure 12:
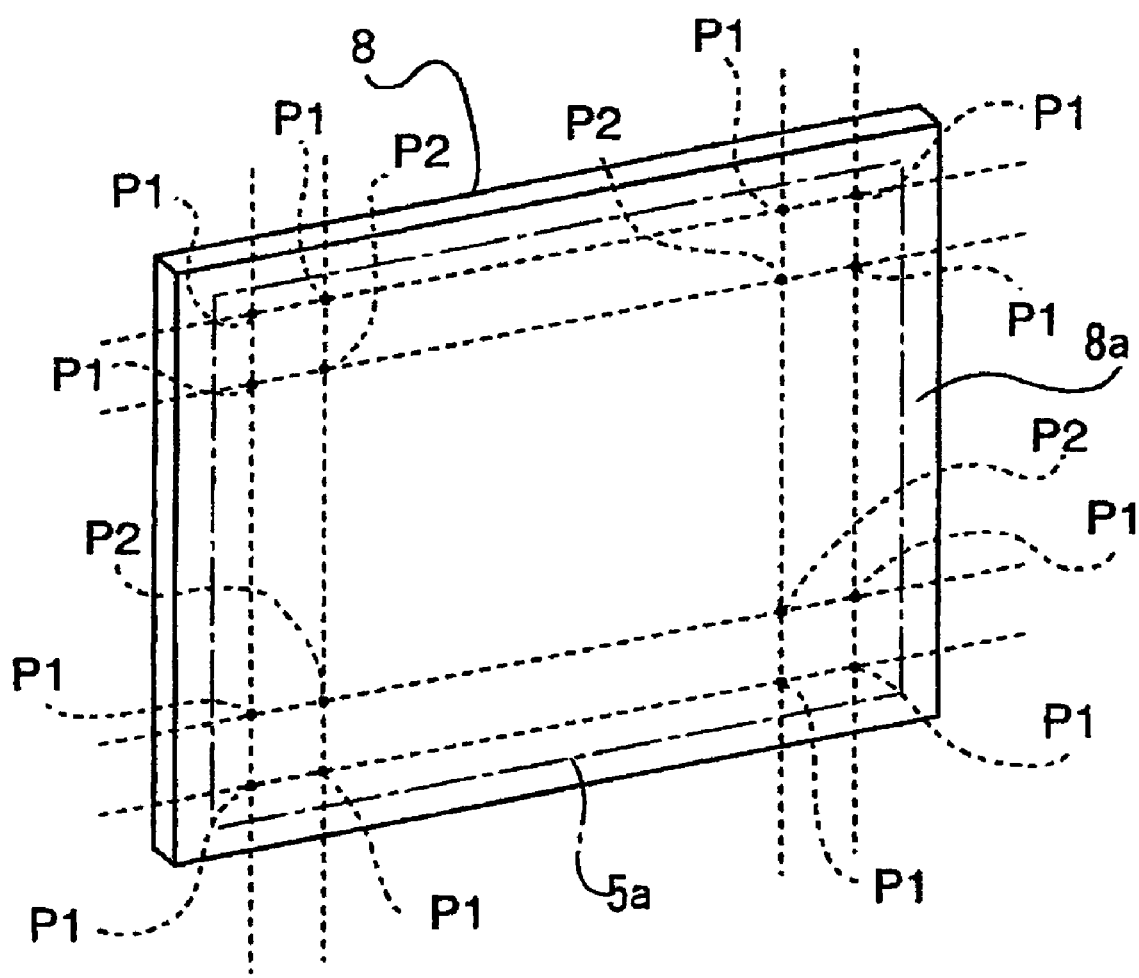
FIG. 12 is a perspective view schematically showing an example of locations on a sheet-like member of spacers, which are in the form of balls having a diameter of 0.9 mm.
Figure 13:
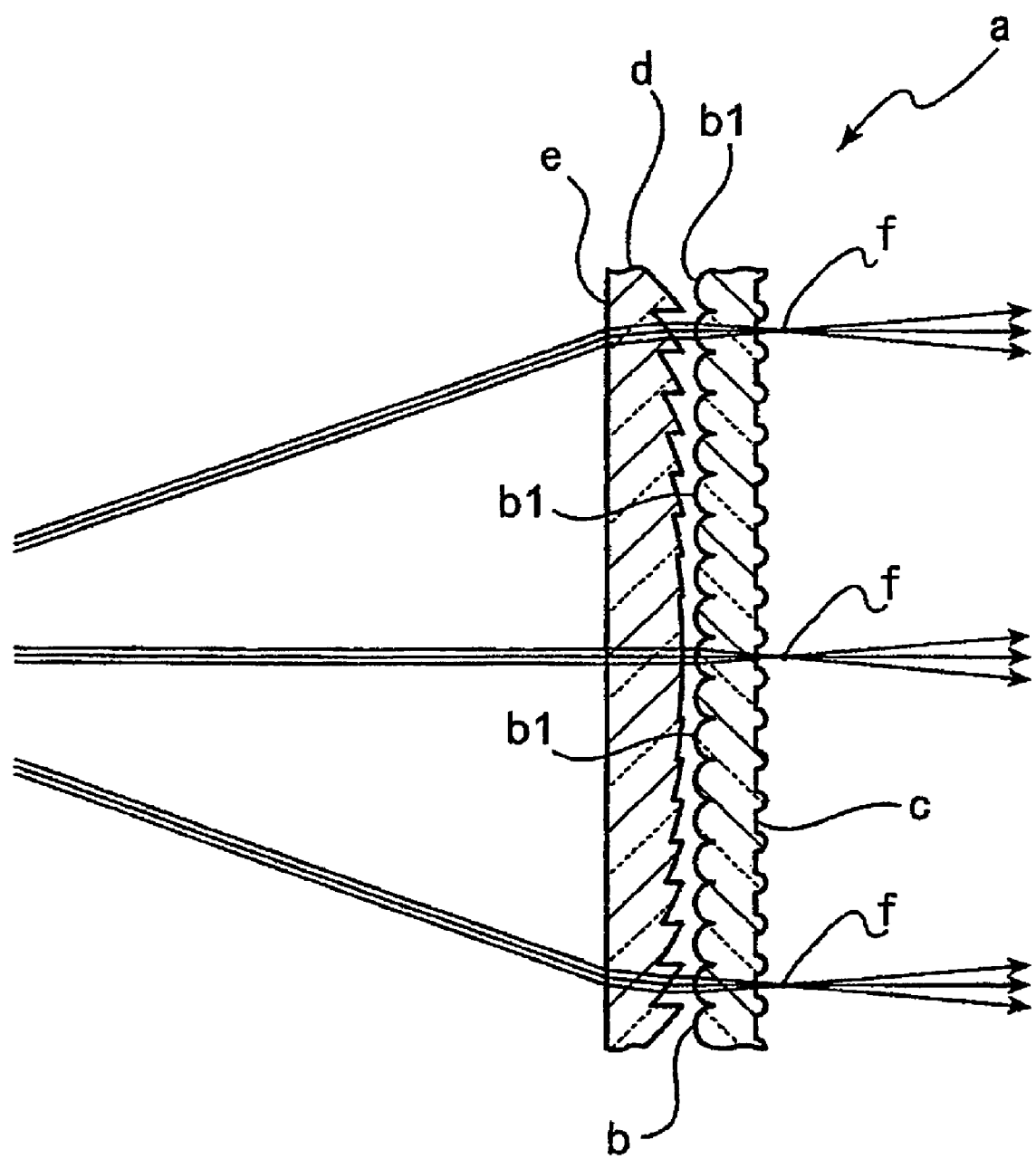
FIG. 13 is a horizontal cross-sectional view schematically showing the arrangement and function of a conventional rear projection-type screen.
Figure 14:
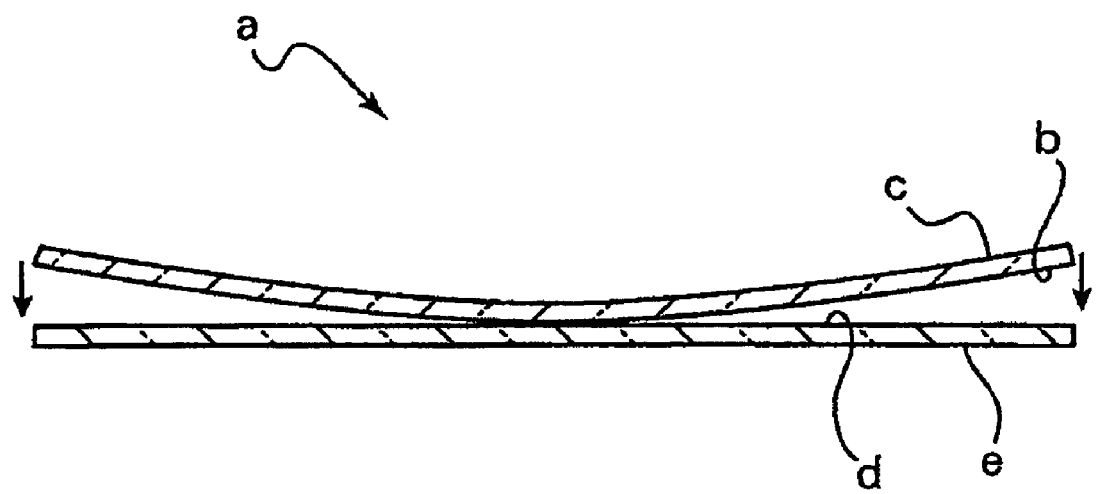
FIG. 14 show, together with FIG. 15, a process of assembling the conventional rear projection-type screen, and is a cross-sectional view schematically showing an initial state thereof.
Figure 15:
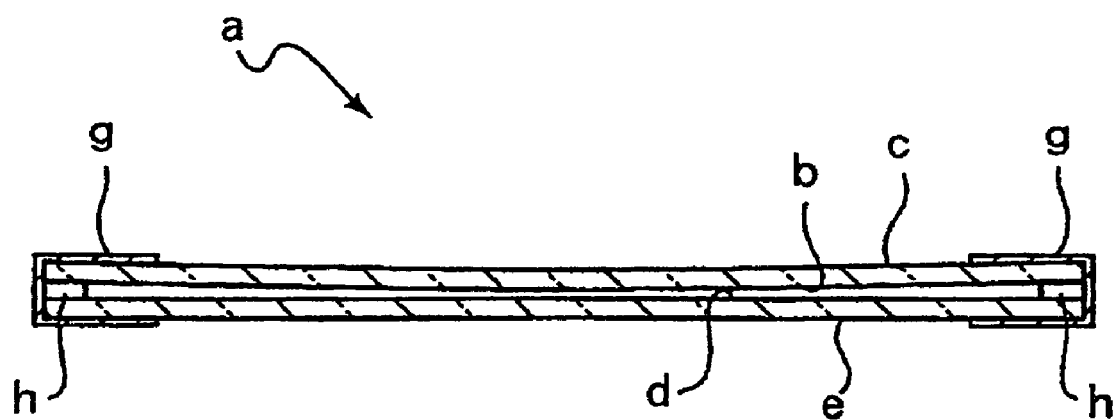
FIG. 15 is a cross-sectional view schematically showing an assembled state thereof.

For example, if the spacers 14, 14, . . . are of a spherical shape having a diameter of 0.9 mm, then, as shown in FIG. 12, the spacers 14, 14, . . . are positioned respectively at limited locations, i.e., twelve locations P1, P1, . . . in the peripheral region of the area corresponding to the effective screen area 5a of the projection screen 5, which is indicated by the dot-and-dash line. The spacers 14, 14, . . . thus positioned make themselves essentially unrecognizable when the projection screen 5 is viewed from outside, and any optical effect that the spacers 14, 14, . . . have on the projection screen 5 is substantially negligible. If the lenses are brought into strong contact with each other irrespective of the spacers 14, 14, . . . disposed in the above locations P1, P1, . . . , then additional spacers may be positioned respectively at four locations P2, P2, . . . inward of the locations P1, P1, . . . .

As described above, the spacers 14, 14, . . . should ideally be of a size kept within a rectangular parallelepiped region having a depth, a width, and a height each of 0.3 mm or less. In view of the ease with which to manufacture the spacers 14, 14, . . . , they are sufficiently practical in use if their size is kept within a rectangular parallelepiped region having sizes each of 1 mm or less. Even if the spacers 14, 14, . . . have a size kept within a rectangular parallelepiped region having a depth, a width, and a height each of 0.3 mm or more, their presence may be made inconspicuous and they may made less optically influential by improving the number of spacers 14, 14, . . . and the locations thereof between the lenticular lens sheet 7 and the Fresnel lens sheet 8.

The spacers 14, 14, . . . are not limited to any materials, but may be made of a transparent material such as polycarbonate (PC), polymethyl methacrylate (PMMA), or the like. If the spacers 14, 14, . . . are formed separately from the lens such as the lenticular lens 9 or the Fresnel lens 11, then the spacers 14, 14, . . . may be affixed to one of the sheet members by an adhesive and disposed between the lenticular lens 9 and the Fresnel lens 11.

As shown in FIG. 5, the spacers 14, 14, . . . may be positioned between the crests of the confronting lens elements of the two sheet-like members, i.e., between the crests of the cylindrical lenses 9a, 9a, . . . of the lenticular lens 9 and the crests of the ring strips 11a, 11a, . . . of the Fresnel lens 11.

Though not illustrated and described in detail, the lenticular lens sheet 7 and the Fresnel lens sheet 8 are fixed integrally together. One of the sheet-like members, e.g., the lenticular lens sheet 7 is formed, as a warped sheet-like member, the warped lenticular lens sheet 7 is placed over the other sheet-like member, i.e., the Fresnel lens sheet 8, a pressure is applied to superpose the peripheral edge of the lenticular lens sheet 7 on the peripheral edge of the Fresnel lens sheet 8, and tapes 15 are applied, for example, to their peripheral edges (see FIG. 3).

In the projection screen 5, the spacers 14, 14, . . . are positioned between the crests of the cylindrical lenses 9a, 9a, . . . of the lenticular lens sheet 7 and the crests of the ring strips 11a, 11a, . . . of the Fresnel lens sheet 8 which confronts the lenticular lens sheet 7. Thus, the lenticular lens sheet 7 and the Fresnel lens sheet 8 remain spaced from each other by a distance, i.e., 1 mm or less. The distance is equal to the size of the spacers 14, 14, . . . which is kept within the rectangular parallelepiped region Ra having a depth, a width, and a height each of 1 mm or less, even in those regions where the spacers 14, 14, . . . are not present between the lenticular lens sheet 7 and the Fresnel lens sheet 8.

In as much as the lenticular lens 9 of the lenticular lens sheet 7 and the Fresnel lens 11 of the Fresnel lens sheet 8 are spaced from each other by a suitable distance, the cylindrical lenses 9a, 9a, . . . or the ring strips 11a, 11a, . . . are prevented from being deformed and their refracting surfaces are prevented from being scratched due to contact between lenticular lens 9 and the Fresnel lens 11. The above advantages are obtained if the compound-eye lens sheet 12 is used instead of the lenticular lens sheet 7.

If there is a region where the lenses tend to be brought into strong contact with each other, other than the regions where the spacers 14, 14, . . . are positioned within the effective screen area 5a of the projection screen 5, then spacers 14, 14, . . . may additionally be placed in such a region.

As described above, the spacers 14, 14, . . . are formed of synthetic resin integrally with or separately from the lenticular lens sheet 7, the Fresnel lens sheet 8, or the compound-eye lens sheet 12, which is the sheet-like member. Any increase in the cost of the projection screen 5 owing to the inclusion of the spacers 14, 14, . . . is very small.

The specific shapes and structures of the various components in the above embodiments are given for illustrative purpose only for reducing the invention to practice, and should not be applied to limitative interpretation of the technical scope of the present invention.

As is apparent from the foregoing description, the rear projection-type screen according to the present invention is a rear projection-type screen for passing and focusing image light emitted from an image light source. Two sheet-like members each made of a transparent material and having minute lenses formed on at least one surface thereof are disposed such that their surfaces with the lenses formed thereon confront each other. A plurality of spacers are disposed at appropriate spaced intervals between the confronting lenses of the two sheet-like members within an effective screen area for passing and focusing the image light thereon.

With the rear projection-type screen according to the present invention, therefore, since the spacers are disposed between the confronting lenses of the two sheet-like members, the confronting lenses of the two sheet-like members are spaced from each other by a distance substantially equal to the size of the spacers. The lenses are thus kept out of contact with each other, and the lenses are prevented from being scratched and lens elements are prevented from being deformed due to contact between the lenses, allowing the rear projection-type screen to display high-quality images thereon.

According to the present invention, the two sheet-like members include, respectively, a lenticular lens sheet having a lenticular lens formed on at least one surface thereof and a Fresnel lens sheet having a Fresnel lens formed on one surface thereof. Consequently, the range in which an image displayed on the screen can properly be recognized in one direction, e.g., a horizontal direction, can be increased.

According to the present invention, the two sheet-like members include, respectively, a compound-eye lens sheet having a compound-eye lens formed on one surface thereof and a Fresnel lens sheet having a Fresnel lens formed on one surface thereof. Consequently, the range in which an image displayed on the screen can properly be recognized in all directions can be increased, and the displayed image can be displaced three-dimensionally.

According to the present invention, the spacers are positioned between the crests of lens elements of the confronting lenses of the two sheet-like members. Therefore, the confronting lenses of the two sheet-like members are spaced from each other by a distance substantially equal to the size of the spacers. The lenses are thus kept out of contact with each other and prevented from being scratched and deformed due to contact between the lenses, allowing the rear projection-type screen to display high-quality images thereon.

According to the present invention, the spacers are formed integrally with the lens of one of the sheet-like members. Therefore, the design of the shape of the lenses of the sheet-like member includes locations of the spacers. The spacers can be placed in effective locations, which are not optically influential, and any trouble of subsequently placing the spacers is eliminated.

According to the present invention, the spacers are formed to a size kept within a rectangular parallelepiped region having a depth, a width, and a height each of 1 mm or less. Therefore, the presence of the spacers is made inconspicuous and an optical effect that the spacers have is eliminated.

According to the present invention, the spacers are disposed in a peripheral region of an effective screen area. Therefore, the presence of the spacers is made more inconspicuous.

The rear projection-type image display device according to the present invention is a rear projection-type image display device for projecting image light emitted from an image light source at an enlarged scale with projection means. The device includes a rear projection-type screen for passing and focusing the image light projected by the projection means. The rear projection-type screen includes two sheet-like members each made of a transparent material and having minute lenses formed on at least one surface thereof. The two sheet-like members are disposed such that their surfaces with the lenses formed thereon confront each other, and a plurality of spacers are disposed at appropriate spaced intervals between the confronting lenses of the two sheet-like members within an effective screen area for passing and focusing the image light thereon.

With the rear projection-type screen according to the present invention, therefore, since the spacers are disposed between the confronting lenses of the two sheet-like members, the confronting lenses of the two sheet-like members are spaced from each other by a distance substantially equal to the size of the spacers. The lenses are thus kept out of contact with each other, and the lenses are prevented from being scratched and lens elements are prevented from being deformed due to contact between the lenses, allowing the rear projection-type screen to display high-quality images thereon.

According to the present invention, the two sheet-like members include, respectively, a lenticular lens sheet having a lenticular lens formed on at least one surface thereof and a Fresnel lens sheet having a Fresnel lens formed on one surface thereof. Consequently, the range in which an image displayed on the screen can properly be recognized in one direction, e.g., a horizontal direction, can be increased.

According to the present invention, the two sheet-like members include, respectively, a compound-eye lens sheet having a compound-eye lens formed on one surface thereof and a Fresnel lens sheet having a Fresnel lens formed on one surface thereof. Consequently, the range in which an image displayed on the screen can properly be recognized in all directions can be increased, and the displayed image can be displaced three-dimensionally.

According to the present invention, the spacers are positioned between the crests of lens elements of the confronting lenses of the two sheet-like members. Therefore, the confronting lenses of the two sheet-like members are spaced from each other by a distance substantially equal to the size of the spacers. The lenses are thus kept out of contact with each other and prevented from being scratched and deformed due to contact between the lenses, allowing the rear projection-type screen to display high-quality images thereon.

According to the present invention, the spacers are formed integrally with the lens of one of the sheet-like members. Therefore, the design the shape of the lenses of the sheet-like member includes locations of the spacers. The spacers can be placed in effective locations, which are not optically influential, and any trouble of subsequently placing the spacers is eliminated.

According to the present invention, the spacers are formed to a size kept within a rectangular parallelepiped region having a depth, a width, and a height each of 1 mm or less. Therefore, the presence of the spacers is made inconspicuous and an optical effect that the spacers have is eliminated.

According to the present invention, the spacers are disposed in a peripheral region of an effective screen area. Therefore, the presence of the spacers is made more inconspicuous.

What is claimed is:

1. A rear projection-type screen for passing and focusing image light emitted from an image light source, comprising:
    two sheet-like members, each made of a transparent material and having minute lenses formed on at least one surface thereof, are disposed such that the surfaces with the lenses formed thereon confront each other; and
    a plurality of spacers are disposed, at appropriate spaced intervals between the confronting lenses of the two sheet-like members, (a) within an effective screen area for passing and focusing the image light thereon and (b) in a peripheral region of the effective screen area.

2. The rear projection-type screen according to claim 1, characterized in that said two sheet-like members comprise, respectively, a lenticular lens sheet having a lenticular lens formed on at least one surface thereof and a Fresnel lens sheet having a Fresnel lens formed on one surface thereof.

3. The rear projection-type screen according to claim 1, characterized in that said two sheet-like members comprise, respectively, a compound-eye lens sheet having a compound-eye lens formed on one surface thereof and a Fresnel lens sheet having a Fresnel lens formed on one surface thereof.

4. The rear projection-type screen according to claim 1, characterized in that said spacers are positioned between the crests of lens elements of the confronting lenses of the two sheet-like members.

5. The rear projection-type screen according to claim 1, characterized in that said spacers are formed integrally with one of the sheet-like members.

6. The rear projection-type screen according to claim 1, characterized in that said spacers are formed to a size kept within a rectangular parallelepiped region having a depth, a width, and a height each of 1 mm or less.

7. A rear projection-type image display device for projecting image light emitted from an image light source at an enlarged scale with projection means, comprising:
    a rear projection-type screen for passing and focusing the image light projected by the projection means;
    said the rear projection-type screen comprising two sheet-like members, each made of a transparent material and having minute lenses formed on at least one surface thereof, the two sheet-like members being disposed such that their surfaces with the lenses formed thereon confront each other; and
    a plurality of spacers disposed, at appropriate spaced intervals between the confronting lenses of the two sheet-like members, (a) within an effective screen area for passing and focusing the image light thereon and (b) in a peripheral region of the effective screen area.

8. The rear projection-type image display device according to claim 7, characterized in that said two sheet-like members comprise, respectively, a lenticular lens sheet having a lenticular lens formed on at least one surface thereof and a Fresnel lens sheet having a Fresnel lens formed on one surface thereof.

9. The rear projection-type image display device according to claim 7, characterized in that said two sheet-like members comprise, respectively, a compound-eye lens sheet having a compound-eye lens formed on one surface thereof and a Fresnel lens sheet having a Fresnel lens formed on one surface thereof.

10. The rear projection-type image display device according to claim 7, characterized in that said spacers are positioned between the crests of lens elements of the confronting lenses of the two sheet-like members.

11. The rear projection-type image display device according to claim 7, characterized in that said spacers are formed integrally with one of the sheet-like members.

12. The rear projection-type image display device according to claim 7, characterized in that said spacers are formed to a size kept within a rectangular parallelepiped region having a depth, a width, and a height each of 1 mm or less.

* * * * *